US009799225B2

(12) United States Patent
Lueck et al.

(10) Patent No.: US 9,799,225 B2
(45) Date of Patent: Oct. 24, 2017

(54) METHOD AND APPARATUS FOR BUILDING A TAXIING ROUTE

(71) Applicant: The Boeing Company, Chicago, IL (US)

(72) Inventors: Scott Allen Lueck, Denver, CO (US); Aaron John Jacobson, Castle Rock, CO (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/707,212

(22) Filed: May 8, 2015

(65) Prior Publication Data
US 2016/0328977 A1 Nov. 10, 2016

(51) Int. Cl.
G08G 5/00 (2006.01)
G06F 3/023 (2006.01)
G01C 21/00 (2006.01)
G01C 23/00 (2006.01)
G06F 3/0488 (2013.01)
G08G 5/06 (2006.01)
B64D 45/00 (2006.01)

(52) U.S. Cl.
CPC .......... G08G 5/0034 (2013.01); G01C 21/00 (2013.01); G01C 23/005 (2013.01); G06F 3/0237 (2013.01); G06F 3/04883 (2013.01); G08G 5/0021 (2013.01); G08G 5/0047 (2013.01); G08G 5/065 (2013.01); B64D 2045/0075 (2013.01); G08G 5/0013 (2013.01)

(58) Field of Classification Search
CPC .................. G08G 5/0034; G08G 5/0047
See application file for complete search history.

(56) References Cited

U.S. PATENT DOCUMENTS

| 6,167,627 | B1* | 1/2001 | Wilder | G01C 21/20 235/61 NV |
| 7,222,017 | B2* | 5/2007 | Clark | G01C 23/00 340/958 |
| 7,460,029 | B2* | 12/2008 | Boorman | G01C 23/00 340/975 |
| 7,751,948 | B2* | 7/2010 | Boorman | G01C 23/00 244/75.1 |
| 7,813,845 | B2* | 10/2010 | Doose | G01C 21/26 340/951 |

(Continued)

FOREIGN PATENT DOCUMENTS

EP 2273237 A1 1/2011
EP 2355070 A2 8/2011

OTHER PUBLICATIONS

European Patent Office Search Report, dated Sep. 26, 2016, regarding Application No. 161686985, 8 pages.

Primary Examiner — Frederick Brushaber
(74) Attorney, Agent, or Firm — Yee & Associates, P.C.

(57) ABSTRACT

A method and apparatus for building a route for moving an aircraft within an on-ground environment by identifying route elements. Input that is entered by an operator of an aircraft based on route instructions provided by a controller is received through a character input section of a graphical user interface. Route information is generated based on the input using character recognition. The route for moving the aircraft within the on-ground environment is built based on the route information.

18 Claims, 15 Drawing Sheets

(56) References Cited

U.S. PATENT DOCUMENTS

| | | | |
|---|---|---|---|
| 8,165,810 B2* | 4/2012 | Fetzmann | G05D 1/0083 340/972 |
| 8,386,167 B2* | 2/2013 | Clark | G01C 21/20 701/411 |
| 8,401,775 B2* | 3/2013 | Rozovski | G08G 5/0013 340/972 |
| 8,502,701 B2* | 8/2013 | Goh | G08G 5/065 340/971 |
| 8,788,187 B2 | 7/2014 | Doose et al. | |
| 2003/0102987 A1* | 6/2003 | Walter | G01C 23/005 340/972 |
| 2005/0090969 A1* | 4/2005 | Siok | G08G 5/0043 701/120 |
| 2005/0143871 A1* | 6/2005 | Boorman | G01C 23/00 701/3 |
| 2005/0283305 A1 | 12/2005 | Clark et al. | |
| 2006/0161336 A1* | 7/2006 | Wischmeyer | G01C 23/00 701/431 |
| 2007/0240056 A1* | 10/2007 | Pepitone | G05D 1/0083 715/705 |
| 2009/0306887 A1* | 12/2009 | Clark | G01C 23/00 701/533 |
| 2012/0105318 A1* | 5/2012 | Nutaro | G06F 3/04815 345/157 |
| 2012/0316766 A1 | 12/2012 | LaFon et al. | |
| 2014/0191983 A1* | 7/2014 | Choi | G06F 3/0412 345/173 |
| 2014/0199947 A1* | 7/2014 | Jung | H04B 7/26 455/68 |

* cited by examiner

METHOD AND APPARATUS FOR BUILDING A TAXIING ROUTE

BACKGROUND INFORMATION

1. Field

The present disclosure relates generally to aircraft and, in particular, to managing aircraft movement on the ground. Still more particularly, the present disclosure relates to a method and apparatus for quickly and easily managing a route for moving an aircraft within an on-ground environment.

2. Background

Taxiing is the movement of an aircraft from one location on the ground to another location on the ground. For example, at an airport, an aircraft may taxi from a parking location at the airport, such as a gate or terminal, to a runway prior to takeoff. As another example, the aircraft may taxi from a runway to a parking location at the airport after landing.

Typically, the taxiing route for an aircraft is provided through a brief on-the-fly verbal interaction with a ground controller of Air Traffic Control (ATC). In some cases, the entire verbal interaction may last only seconds. The operator of an aircraft, for example, the pilot, copilot or other crew member, typically resorts to jotting down on paper the instructions provided by ATC, as quickly and as best as the operator is able.

For example, a pilot of an aircraft may call a ground controller while the aircraft is parked. The ground controller may verbally provide route instructions that form the taxiing route for the aircraft to the operator. These route instructions may identify, for example, a gate, one or more taxiways, one or more holding areas, one or more turns, one or more runways, or some combination thereof.

As the ground controller verbally provides the route instructions, the pilot may manually record this information using, for example, pen and paper, to create a copy of the taxiing route. Recording the taxiing route in this manner may be more difficult than desired. For example, without limitation, a ground controller may speak very fast, which may make manually recording the information more difficult than desired.

Further, in some cases, many airports have a number of different gates, taxiways, and runways. As the complexity of an airport increases, the complexity of the taxiing route may also increase. Quickly and accurately manually recording a complex taxiing route in a matter of seconds, may be more difficult than desired. Therefore, it would be desirable to have a method and apparatus that take into account at least some of the issues discussed above, as well as other possible issues.

SUMMARY

In one illustrative embodiment, an apparatus comprises a graphical user interface and a route manager in communication with the graphical user interface. The graphical user interface includes a character input section for entering input that is based on route instructions provided by a controller. The route manager receives the input entered through the character input section, generates route information based on the input using character recognition, and builds a route for moving an aircraft within an on-ground environment based on the route information.

In another illustrative embodiment, a route management system comprises a display system, a graphical user interface displayed on the display system, and a route manager. The graphical user interface comprises an input area. The input area includes a character input section and a set of control objects. The route manager receives input through the character input section and at least one control object in the set of control objects, generates route information based on the input using character recognition, and builds a route for taxiing an aircraft at an airport based on the route information.

In yet another illustrative embodiment, a method for building a route for moving an aircraft within an on-ground environment is provided. Input that is entered by an operator of the aircraft based on route instructions provided by a controller, is received through a character input section of a graphical user interface. Route information is generated based on the input using character recognition. The route for moving the aircraft within the on-ground environment is built based on the route information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
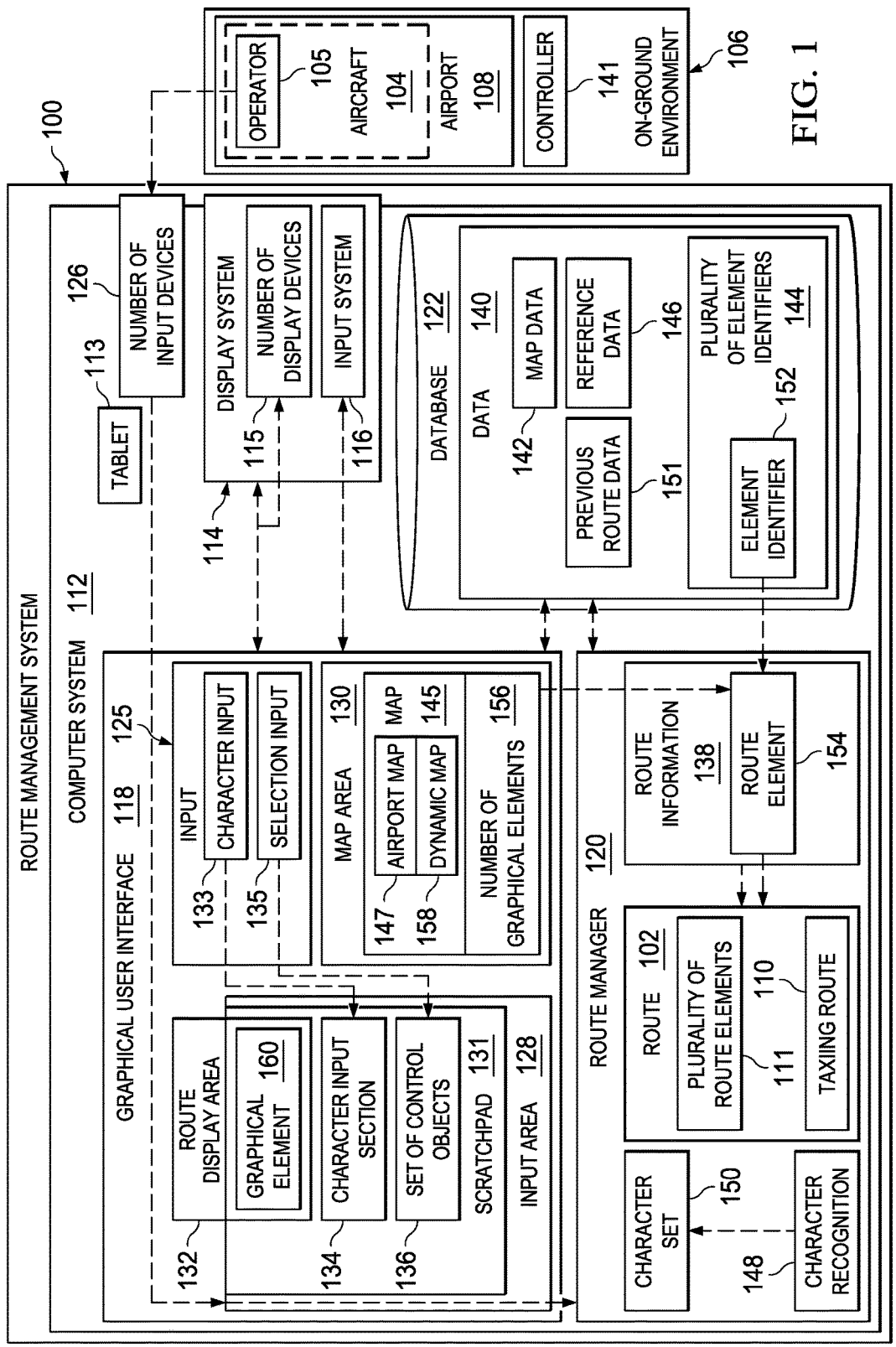
FIG. 1 is an illustration of a route management system in the form of a block diagram in accordance with an illustrative embodiment.

The illustrative embodiments provide a method and apparatus for building a route for moving an aircraft within an on-ground environment that takes into account a number of different considerations. The illustrative embodiments recognize and take into account that it may be desirable to provide a method and apparatus that enable an operator of an aircraft to quickly and accurately record the route elements of a taxiing route within operational constraints.

The illustrative embodiments recognize and take into account that using a graphical user interface may reduce the time and effort associated with recording a taxiing route while a ground controller verbally provides the route elements for the taxiing route. Further, it may be desirable to enable the operator of an aircraft to visualize the taxiing route with respect to the airport as the taxiing route is being recorded and built.

Thus, the illustrative embodiments provide a method and apparatus for quickly and accurately building a route for moving an aircraft within an on-ground environment such as, but not limited to, an airport. A graphical user interface may be displayed on a display system. Input that is entered by an operator of an aircraft based on route instructions provided by a controller may be received through a character input section of the graphical user interface. Route information is generated based on the input entered through the graphical user interface using character recognition. This route information may include, for example, without limitation, an identification of one or more route elements. The route for moving the aircraft within the on-ground environment is built based on the route information.

The route instructions provided by the controller that are the basis for the input entered by the aircraft may be, for example, without limitation, verbal route instructions provided by a ground controller of Air Traffic Control (ATC). These verbal route instructions may be on-the-fly route instructions that may be provided within a very brief period of time. For example, the entire set of verbal route instructions may be provided in less than a minute. In some cases, the entire set of verbal route instructions may be provided in a matter of seconds.

In some cases, a map of the on-ground environment may be displayed in a map area of the graphical user interface. This map may be updated based on the route information generated as the route is being built. For example, one or more graphical elements representing one or more route elements may be displayed over the map as the route is being built. In this manner, the map may be a dynamic map that enables the operator of the aircraft to visualize the route elements of the route as the route is being built. This type of visualization may help provide the operator of the aircraft with situational awareness. In particular, this type of visualization may provide the operator of the aircraft with the specific, real-time, on-ground environment in which the aircraft is operating.

Referring now to the figures and, in particular, with reference to FIG. 1, an illustration of a route management system is depicted in the form of a block diagram in accordance with an illustrative embodiment. Route management system 100 may be an example of one type of system that may be used to build route 102 for aircraft 104. Operator 105 may then use route 102 to move aircraft 104 relative to on-ground environment 106. For example, operator 105 may use route 102 to move aircraft 104 from one location within on-ground environment 106 to another location within on-ground environment 106.

In one illustrative example, on-ground environment 106 includes airport 108. In this example, operator 105 may use route 102 to taxi aircraft 104 from one location to another location at airport 108. When used for taxiing, route 102 may also be referred to as taxiing route 110. Taxiing route 110 may also be referred to as taxi clearance. In other illustrative examples, on-ground environment 106 may include an airfield, a military airbase, or some other type of airdrome. Depending on the implementation, on-ground environment 106 may take the form of any environment having a plurality of predefined physical areas for moving aircraft and parking aircraft.

Route 102 may be comprised of plurality of route elements 111. When route 102 is to be used for taxiing aircraft 104, plurality of route elements 111 may include any number of aircraft parking locations, terminals, gates, turns, taxiways, runways, hold shorts, holding areas, deicing areas, other types of route elements, or a combination thereof. A hold short may be an instruction for an aircraft to stop and wait some distance short of a taxiway or a runway for some period of time.

Route management system 100 may be implemented using computer system 112. In one illustrative example, computer system 112 may take the form of tablet 113. However, in other illustrative examples, computer system 112 may take the form of a laptop, a notebook, an ultra-portable notebook, a netbook, a palmtop, a laptop-tablet hybrid, a smartphone, or some other type of portable computing system. In still other illustrative examples, computer system 112 may take the form of one or more processor units, microprocessors, computers, integrated circuits, or some combination thereof.

Display system 114 may be used to visually present information about route 102 as route 102 is being built to operator 105. In some cases, display system 114 may visually present route 102 to operator 105 as route 102 is being built.

Depending on the implementation, display system 114 may include number of display devices 115. As used herein, a "number of" items may include one or more items. In this manner, number of display devices 115 may include one or more display devices. When number of display devices 115 includes multiple display devices, these multiple display devices may be used to provide a synchronized or otherwise coordinated display of route 102. In some cases, these multiple display devices may be in communication with each other.

Display system 114 may be connected to or integrated as part of computer system 112, depending on the implementation. In some illustrative examples, one or more of number of display devices 115 may be wirelessly connected to computer system 112. In this manner, display system 114 may be considered part of or separate from computer system 112. In some cases, a first portion of number of display devices 115 may be considered part of computer system 112, while another portion of number of display devices 115 may be considered separate from computer system 112. For example, when number of display devices 115 includes multiple display devices, a first display device of number of display devices 115 may be considered part of computer system 112, while a second display device and a third display device may be considered separate from computer system 112.

In one illustrative example, input system 116 may be integrated with display system 114. For example, without limitation, input system 116 may take the form of a touchscreen that is layered on one of number of display devices 115. In some cases, input system 116 may include a touchscreen that is layered on each of number of display devices 115. In other illustrative examples, input system 116 may take the form of a virtual input system. In this manner, input system 116 may be implemented in different ways.

As depicted, route management system 100 includes graphical user interface 118, route manager 120, and database 122. Graphical user interface 118 is configured for display on display system 114. When display system 114 includes multiple display devices, graphical user interface 118 may be configured for display on one or more of these multiple display devices. In some cases, a different portion of graphical user interface 118 may be implemented on each of these multiple display devices. In other illustrative examples, graphical user interface 118 may be displayed on one of the multiple display devices, while a non-interactive copy of the display is visually presented on the remaining display devices.

Graphical user interface 118 enables a user, such as operator 105 of aircraft 104, to enter input 125 for use in building route 102. Input 125 may also be referred to as user input. Operator 105 may be a pilot, a copilot, a crew member, or some other type of operator of aircraft 104. Although only one operator 105 is described as using graphical user interface 118 to enter input 125 in these illustrative examples, any number of operators may be capable of entering input 125. In some illustrative examples, multiple operators may view display system 114 and use graphical user interface 118 to build route 102.

Operator 105 may enter input 125 through graphical user interface 118 using number of input devices 126. In one illustrative example, number of input devices 126 may include at least one finger of operator 105, a stylus, a digital pen, or some other type of touch input device.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

Graphical user interface 118 may include input area 128, map area 130, and route display area 132. Input 125 may be entered through at least input area 128 of graphical user interface 118. In some illustrative examples, input area 128 may be referred to as scratchpad 131.

In one illustrative example, operator 105 enters input 125 through input area 128 of graphical user interface 118 based on route instructions provided by controller 141. Depending on the implementation, controller 141 may be a human controller, a computerized controller, or some other type of controller. As one illustrative example, controller 141 may be a human ground controller belonging to ATC at airport 108 who provides verbal route instructions. Operator 105 enters input 125 to capture these route instructions as the ground controller speaks.

In another illustrative example, controller 141 may take the form of a computerized controller that provides the route instructions through a speaker system. In some cases, controller 141 may provide the instructions in some other form. For example, controller 141 may provide the route instructions in the form of audible tones or other types of sounds.

Input area 128 of graphical user interface 118 includes character input section 134 and set of control objects 136. Input 125 entered through input area 128 may include character input 133, selection input 135, or both. Character input 133 may be any input that is entered through character input section 134 of input area 128.

Selection input 135 may be any input that is entered by a selection of at least one control object in set of control objects 136. Set of control objects 136 may include at least one of a next button, a previous button, a clear button, a left turn button, a right turn button, a hold short button, or some other type of control object.

Character input section 134 may be configured for efficient entry of character input 133 by an operator, such as operator 105. Further, each control object in set of control objects 136 may be displayed having a size, shape, orientation, and location within input area 128 that is selected for easy and efficient entry of selection input 135 by operator 105.

Route manager 120 may be in communication with graphical user interface 118 and configured to receive input 125. Depending on the implementation, route manager 120 may be implemented using hardware, software, firmware, or some combination thereof. Route manager 120 processes input 125 received through graphical user interface 118 using data 140 stored in database 122 to generate route information 138.

In one illustrative example, database 122 may be stored in computer system 112. In this manner, database 122 may be an integrated database. However, in other illustrative examples, database 122 may be located remotely with respect to computer system 112. In these other examples, route manager 120 may be configured to access data 140 stored in database 122 using at least one of a wired communications link, a wireless communications link, an optical communications link, or some other type of communications link.

Data 140 stored in database 122 may include at least one of map data 142, plurality of element identifiers 144, or reference data 146. Map data 142 may include at least one of a two-dimensional digital map of on-ground environment 106, a three-dimensional digital map of on-ground environment 106, a computer-aided design model of on-ground environment 106, an image of on-ground environment 106, or other types of data.

Graphical user interface 118 may be configured to access map data 142 stored in database 122 and visually present map 145 of on-ground environment 106 within map area 130. When on-ground environment 106 takes the form of airport 108, map 145 may be referred to as airport map 147.

Each of plurality of element identifiers 144 may identify a different route element. Plurality of element identifiers 144 may include identifiers for all of the different possible route elements for forming route 102 with respect to on-ground environment 106. As one illustrative example, an element identifier for a gate, such as gate 57, may be "G57."

In one illustrative example, plurality of element identifiers 144 may be associated with map data 142 of on-ground environment 106. For example, when map data 142 includes a two-dimensional or three-dimensional model of on-ground environment 106, each of plurality of element identifiers 144 may correspond to a different location relative to this model.

Reference data 146 may include other types of information about on-ground environment 106. For example, reference data 146 may include data that links each of set of control objects 136 to a route element. Reference data 146 may include, but is not limited to, information about runways, ramps, aprons, holding areas, deicing areas, buildings and structures, roads, obstacles, hotspots, construction areas, water areas, other types of objects or areas found at or around an airport, such as airport 108, or some combination thereof.

In some illustrative examples, data 140 stored in database 122 may include still other types of data. For example, without limitation, data 140 may include previous route data 151. Previous route data 151 may include information about previous routes that have been built and used. For example, previous route data 151 may include information about previously used taxiing routes, airline company defined taxiing routes, and other types of route information. In some cases, information about previous taxiing routes may be accessed proactively using a combination of a gate identifier and a runway identifier. In some cases, an airport identifier may also be needed.

Previous route data 151 may aid operator 105 in familiarizing himself or herself with previously used taxiing routes prior to operator 105 creating route 102. In some cases, previous route data 151 may be accessed for the purposes of determining the fuel usage of aircraft 104 corresponding to different previously used taxiing routes. In this manner, taxiing routes for aircraft 104 may be modified to improve the fuel efficiency of aircraft 104.

As described above, route manager 120 uses data 140 stored in database 122 to process input 125 to generate route information 138. In particular, route manager 120 may use character recognition 148 and data 140 stored in database 122 to process character input 133. Character recognition 148 may be implemented using optical character recognition (OCR), pattern recognition, artificial intelligence, or some combination thereof.

In one illustrative example, route manager 120 uses character recognition 148 to identify character set 150 based on character input 133. Character set 150 may include one or more characters. As used herein, a character, such as one of character set 150, may take the form of a letter, a number, a symbol, a control character, a drawing, or some other unit of information.

Route manager 120 uses character set 150 to select a corresponding element identifier 152 from plurality of element identifiers 144. In one illustrative example, route manager 120 may match character set 150 to the corresponding element identifier 152. Element identifier 152 may correspond to, and thereby identify, route element 154. Once element identifier 152 has been selected, route element 154 is added to route 102.

In some cases, the match between character set 150 and the corresponding element identifier 152 may be a partial match. For example, character recognition 148 may be implemented using software that is capable of auto-filling missing characters from character set 150, auto-correcting incorrect characters in character set 150 to identify the correct element identifier 152, or both.

In some illustrative examples, character recognition 148 may be enhanced by knowledge of the available characters based on on-ground environment 106 or other information that may make performing character recognition 148 easier. For example, without limitation, data 140 in database 122 may include information about the characters and combinations of characters that are available or possible with respect to on-ground environment 106. Route manager 120 may use this information to enhance and improve character recognition 148 such that the appropriate character set 150 is identified based on character input 133. As one illustrative example, route manager 120 may use the knowledge that airport 108 only has taxiways A-J so that route manager 120 does not match character input 133 to a R character or an X character.

Once route element 154 is added to route 102, graphical element 160 representing route element 154 may be added to route display area 132. In this illustrative example, route display area 132 may be part of input area 128. However, in other illustrative examples, route display area 132 may be separate from input area 128. Graphical element 160 may correspond directly to route element 154 and element identifier 152. In some cases, graphical element 160 may be a graphical label that includes element identifier 152.

Further, once route element 154 has been added to route 102, map 145 displayed in map area 130 of graphical user interface 118 may be updated. For example, without limitation, number of graphical elements 156 may be displayed over map 145 to represent the addition of route element 154 to route 102. In this manner, map 145 may be updated over time as route 102 is being built. In other words, map 145 may dynamically change. Map 145 may also be referred to as dynamic map 158.

When display system 114 includes multiple display devices, updates to map 145 may be viewed by any number of operators in aircraft 104 on-the-fly on these multiple devices. In some cases, different portions of map 145 may be displayed on different devices in number of display devices 115.

When input 125 includes selection input 135, route manager 120 processes selection input 135 to at least one of build route 102 or manage input area 128. For example, depending on selection input 135, route manager 120 may add a new route element to route 102, remove a route element from route 102, modify a route element of route 102, add a new turn direction to route 102, remove a turn direction from route 102, or perform some other operation related to the building of route 102. In other illustrative examples, depending on selection input 135, route manager 120 may clear input area 128, revert to a previous view, or perform some other operation that visually alters input area 128 of graphical user interface 118. In some cases, based on selection input 135, route manager 120 may automatically complete any missing route elements in route 102, automatically correct any incorrect route elements in route 102, or both.

In one illustrative example, route manager 120 may be capable of applying on-the-fly topology checks to ensure that route 102 is correct based on the topology of airport 108 as route 102 is being built. In some cases, set of control objects 136 may include a control object that enables operator 105 to initiate a topology check. In other illustrative examples, route manager 120 may be configured to perform a topology check of route 102 periodically as route 102 is being built. In one example, route manager 120 may perform a topology check of route 102 each time that a new route element is added to route 102 and each time that a route element is modified.

In this manner, graphical user interface 118 enables operator 105 to quickly and easily enter input 125 that may be quickly and accurately used to identify route information 138 for use in building route 102. By updating map 145 displayed in map area 130 as route 102 is built, route manager 120 provides operator 105 with a visualization of route 102 with respect to on-ground environment 106.

The illustration of route management system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, input area 128 may not include set of control objects 136. Instead, gesture-type input may be used to provide selection input 135. For example, graphical user interface 118 may be configured to receive selection input 135 in the form of touch input, such as double-taps, finger swipes, pinching in, pinching out, or a combination thereof.

As described earlier above, route manager 120 may be implemented in software, hardware, firmware, or a combination thereof. When software is used, the operations performed by route manager 120 may be implemented using, for example, without limitation, program code configured to run on a processor unit. When firmware is used, the operations performed by route manager 120 may be implemented using, for example, without limitation, program code and data and stored in persistent memory to run on a processor unit.

When hardware is employed, the hardware may include one or more circuits that operate to perform the operations performed by route manager 120. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

Figure 2:
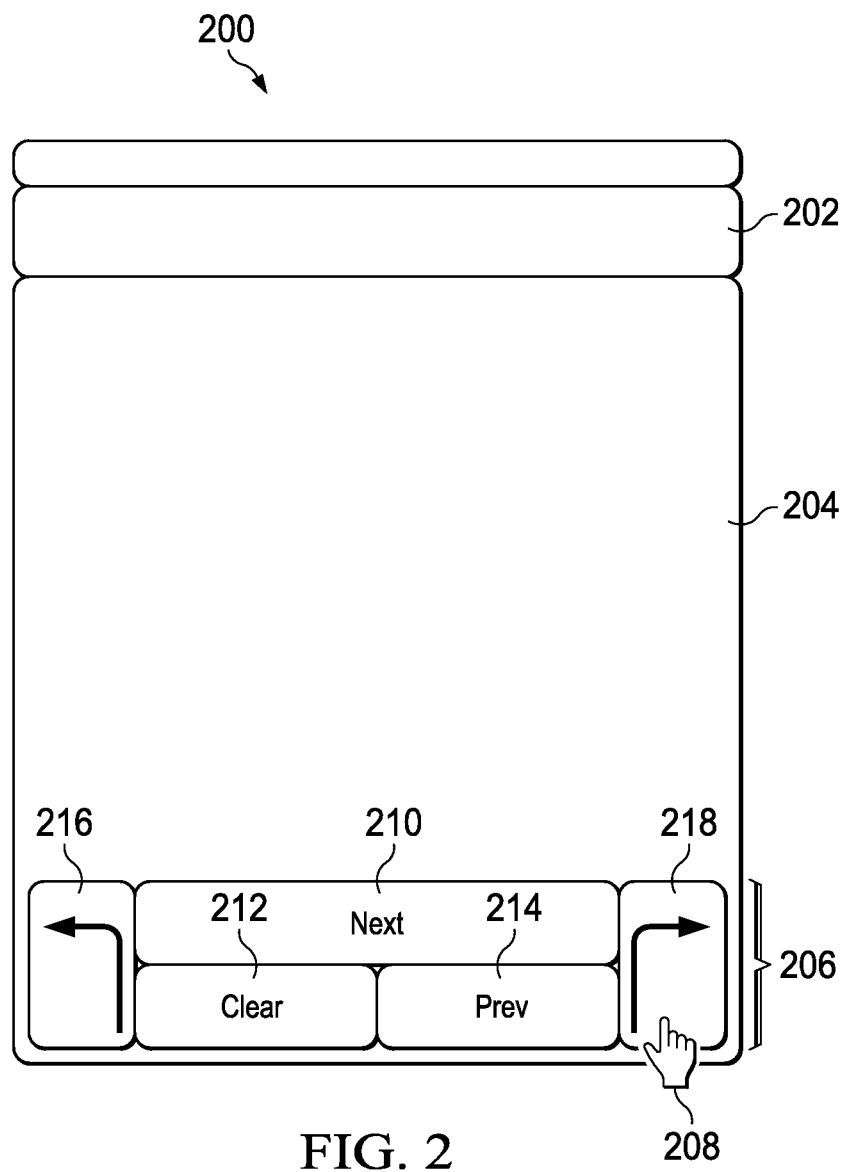
FIG. 2 is an illustration of a scratchpad in accordance with an illustrative embodiment.

With reference now to FIG. 2, an illustration of a scratchpad is depicted in accordance with an illustrative embodiment. In this illustrative example, scratchpad 200 may be an example of one implementation for scratchpad 131 in FIG. 1. Scratchpad 200 may form at least a portion of a graphical user interface, such as graphical user interface 118 in FIG. 1.

As depicted, scratchpad 200 includes route display area 202, character input section 204, and set of control objects 206. Route display area 202, character input section 204, and set of control objects 206 are examples of implementations for route display area 132, character input section 134, and set of control objects 136, respectively, in FIG. 1.

Route display area 202 may be used to display the various route elements of a taxiing route for an aircraft at an airport. These route elements may be displayed in route display area 202 as the route elements are added to the taxiing route. In this manner, route display area 202 may visually present a dynamic display of the route to an operator as the route is being built.

Character input section 204 may be the section within which an operator, such as a pilot or copilot, may enter character input, such as character input 133 in FIG. 1. For example, the operator may use pointer 208 to electronically write or draw characters within character input section 204.

As depicted, set of control objects 206 includes next button 210, clear button 212, previous button 214, left turn button 216, and right turn button 218. A selection of next button 210 by the operator using pointer 208 may indicate that any input that is currently within character input section 204 is to be used for creating a new route element. This new route element is then added to the taxiing route being built. Selecting next button 210 may also clear character input section 204 such that character input section 204 is ready to receive input for use in creating a next new route element for the taxiing route.

A selection of clear button 212 by the operator using pointer 208 may clear character input section 204 such that modified input for creating the new route element may be entered. In other words, selecting clear button 212 enables the operator to reenter input for use in creating the new route element. A selection of previous button 214 by the operator using pointer 208 may allow the operator to return to the previously entered input for the previously added route element.

Selecting left turn button 216 may add a left turn to the taxiing route. Selecting right turn button 218 may add a right turn to the taxiing route.

Figure 3:
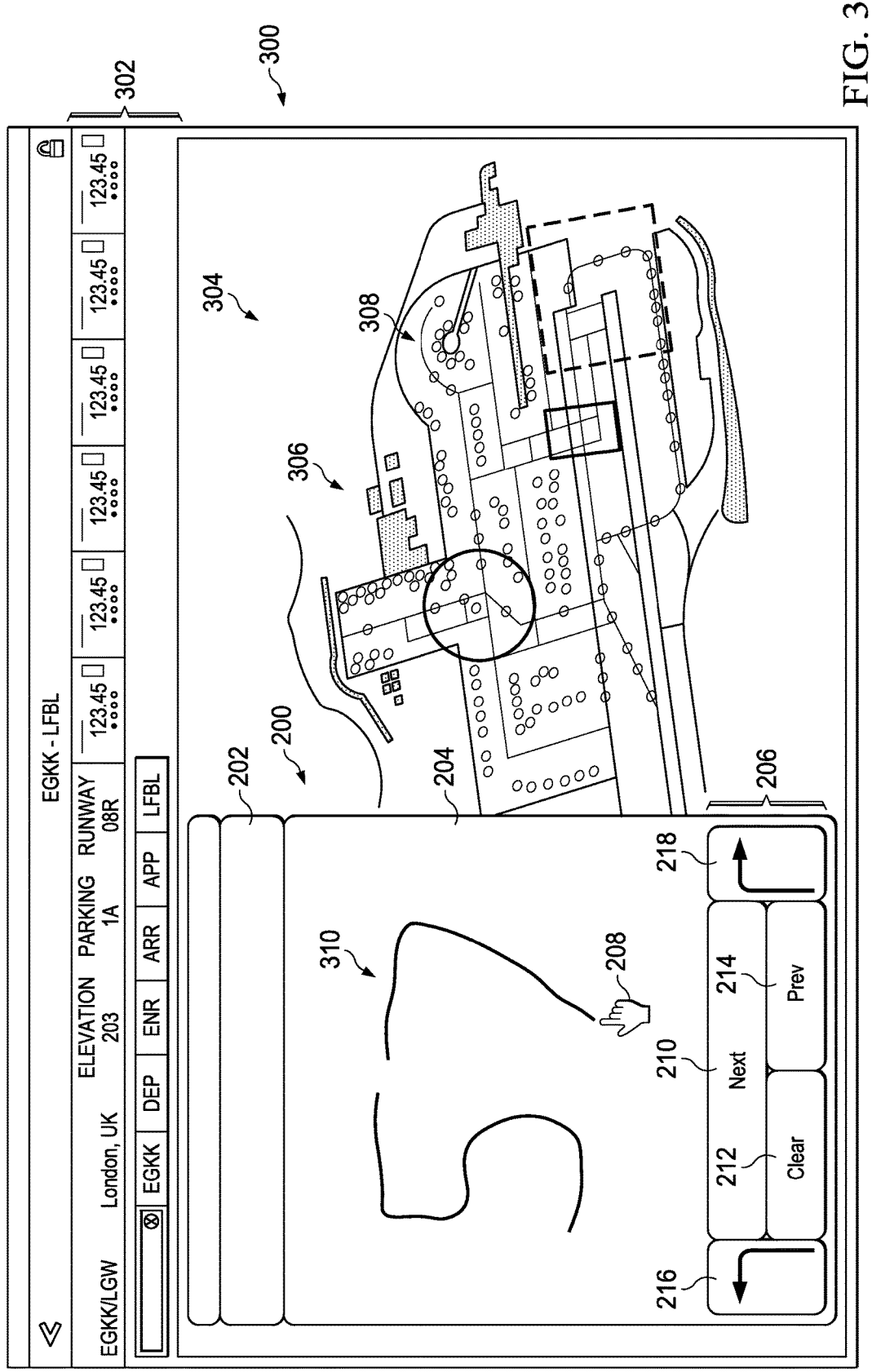
FIG. 3 is an illustration of a graphical user interface that includes a scratchpad in accordance with an illustrative embodiment.

With reference now to FIGS. 3-11, illustrations of the building of a taxiing route using scratchpad 200 from FIG. 2 are depicted in accordance with an illustrative embodiment. Turning now to FIG. 3, an illustration of a graphical user interface that includes scratchpad 200 from FIG. 2 is depicted in accordance with an illustrative embodiment.

In this illustrative example, graphical user interface 300 may be an example of one implementation for graphical user interface 118 in FIG. 1. As depicted, graphical user interface 300 includes scratchpad 200, flight information area 302, and map area 304.

Map area 304 may be an example of one implementation for map area 130 in FIG. 1. As depicted, airport map 306 is visually presented within map area 304. Airport map 306 may be an example of one implementation for airport map 147 in FIG. 1. Airport map 306 may be a zoomed out view representing airport 308 in this illustrative example.

In this illustrative example, an operator, such as a pilot or copilot, may use scratchpad 200 to build a taxiing route for the aircraft to taxi the aircraft from a gate at the airport to a runway. For example, without limitation, the operator may receive verbal route instructions from a ground controller of the ATC at airport 308 for building the taxiing route. The operator uses scratchpad 200 to enter input based on these verbal route instructions.

Building this taxiing route begins with creating a first route element for the route. The first route element may be, for example, without limitation, the gate at which the aircraft is currently parked.

The user may use one or more fingers, a stylus, a digital pen, or some other type of input device to control pointer 208. Pointer 208 may be used to enter character input 310. Pointer 208 may then be used to select next button 210. Once next button 210 has been selected, a route manager that is in communication with graphical user interface 300, such as route manager 120 in FIG. 1, may receive character input 310.

Using character recognition, the route manager identifies a character set based on character input 310. The character set includes "57" in this illustrative example. The route manager may use a plurality of element identifiers, such as plurality of element identifiers 144 in FIG. 1, to identify the first route element based on the character set.

Figure 4:
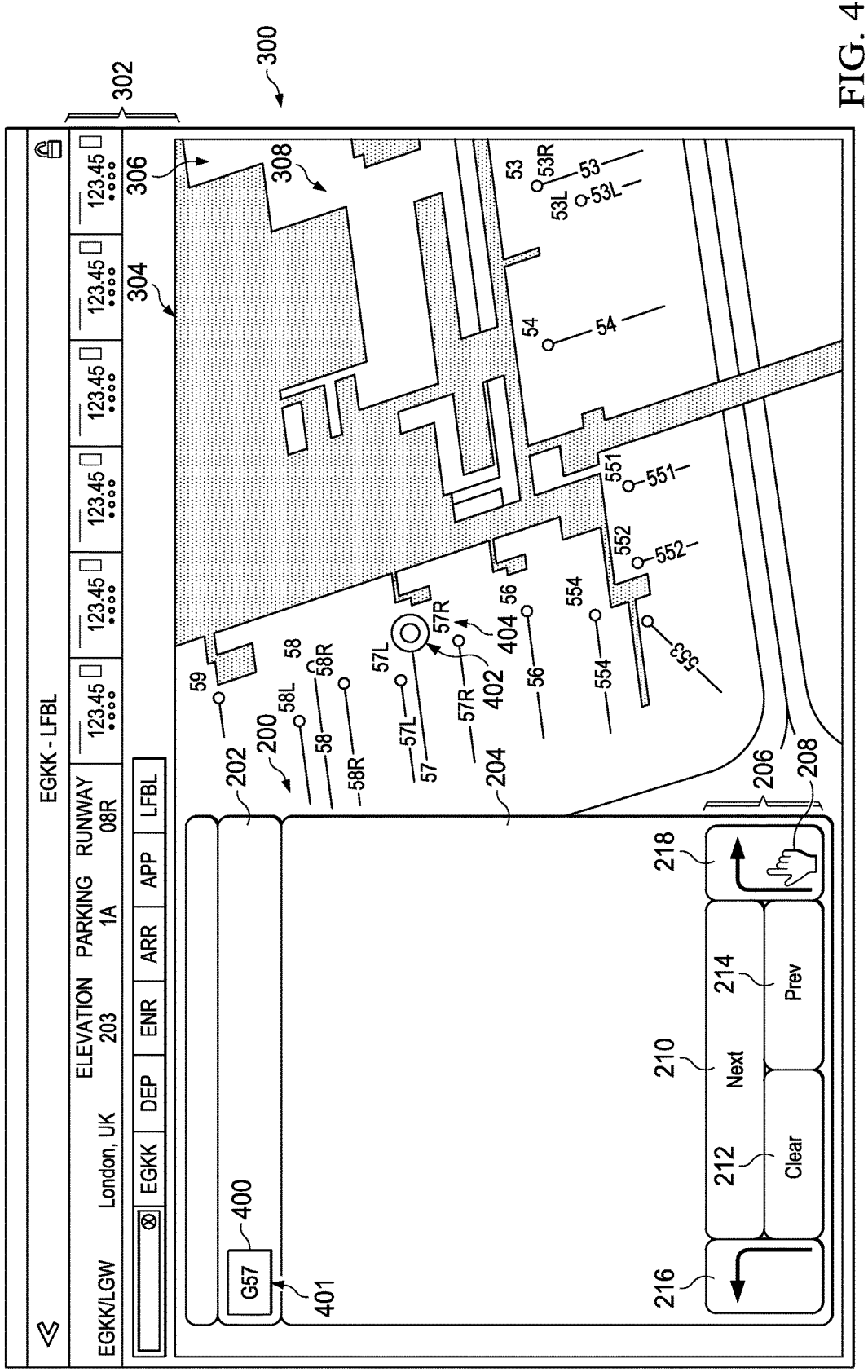
FIG. 4 is an illustration of an addition of a gate to a taxiing route in accordance with an illustrative embodiment.

With reference now to FIG. 4, an illustration of an addition of a gate to a taxiing route is depicted in accordance with an illustrative embodiment. As depicted, graphical element 400 has been added to route display area 202. Graphical element 400 corresponds to a first route element for taxiing route 401. This first route element is gate 57 having element identifier "G57," which was identified using the character set identified based on character input 310 in FIG. 3.

The addition of the first route element to taxiing route 401 results in the display of graphical element 402 at location 404 in airport map 306. Location 404 is the location of gate 57 in airport 308 represented by airport map 306. As depicted, airport map 306 in FIG. 4 has been updated from airport map 306 in FIG. 3 to visually present a zoomed in view of airport 308. In this manner, gate 57 may be more clearly presented.

In this illustrative example, the operator may use pointer 208 to select right turn button 218. This selection indicates that a right turn is to be taken out of gate 57.

Figure 5:
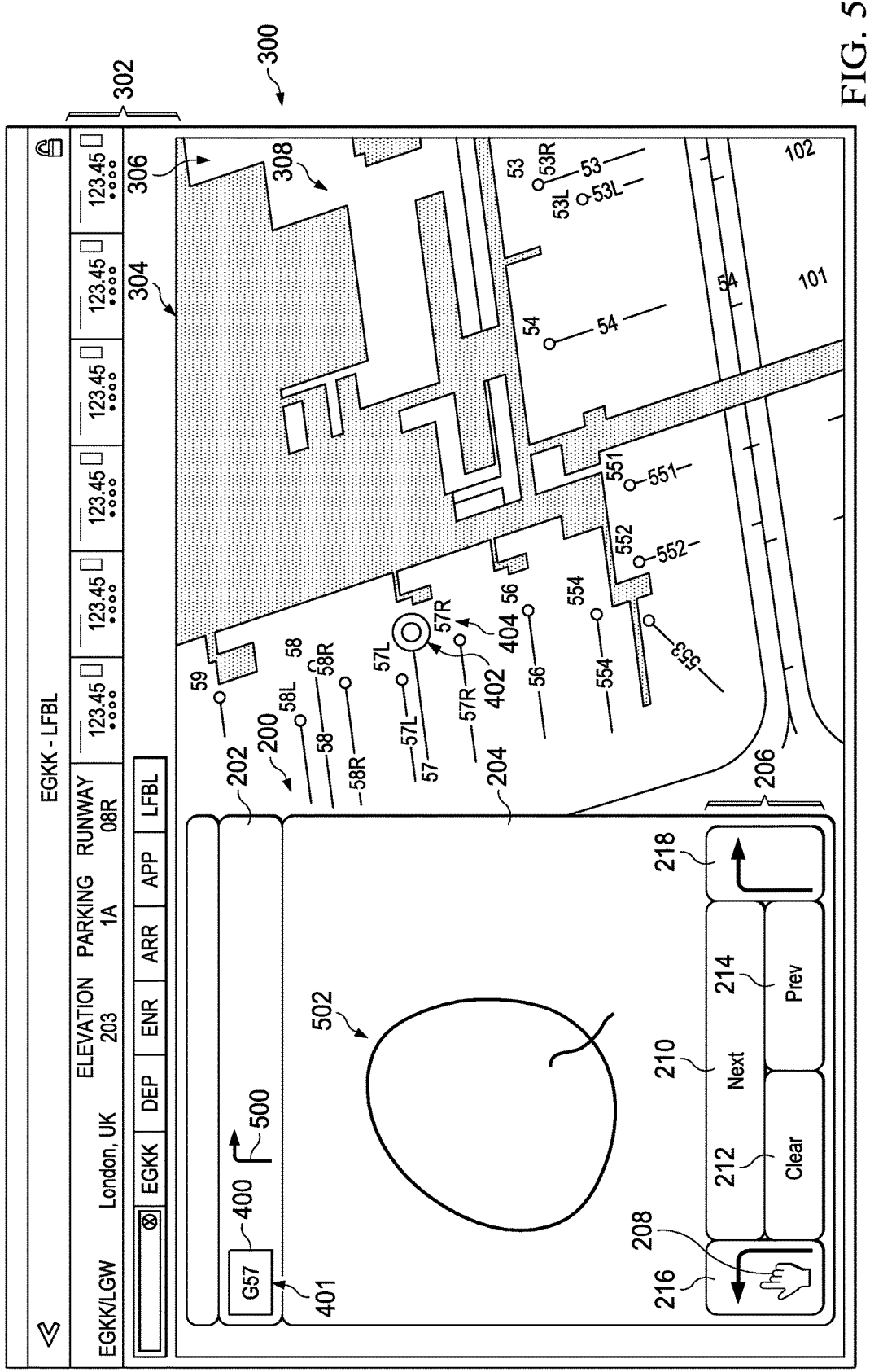
FIG. 5 is an illustration of an addition of a right turn to a taxiing route in accordance with an illustrative embodiment.

With reference now to FIG. 5, an illustration of an addition of a right turn to a taxiing route is depicted in accordance with an illustrative embodiment. In this illustrative example, graphical element 500 has been added to route display area 202. Graphical element 500 corresponds to a right turn that has been added to taxiing route 401.

In this illustrative example, the operator has entered character input 502. The operator then selects left turn button 216. In response to this input, the route manager will identify the route element corresponding to character input 502 and add this route element and a left turn to taxiing route 401.

Figure 6:
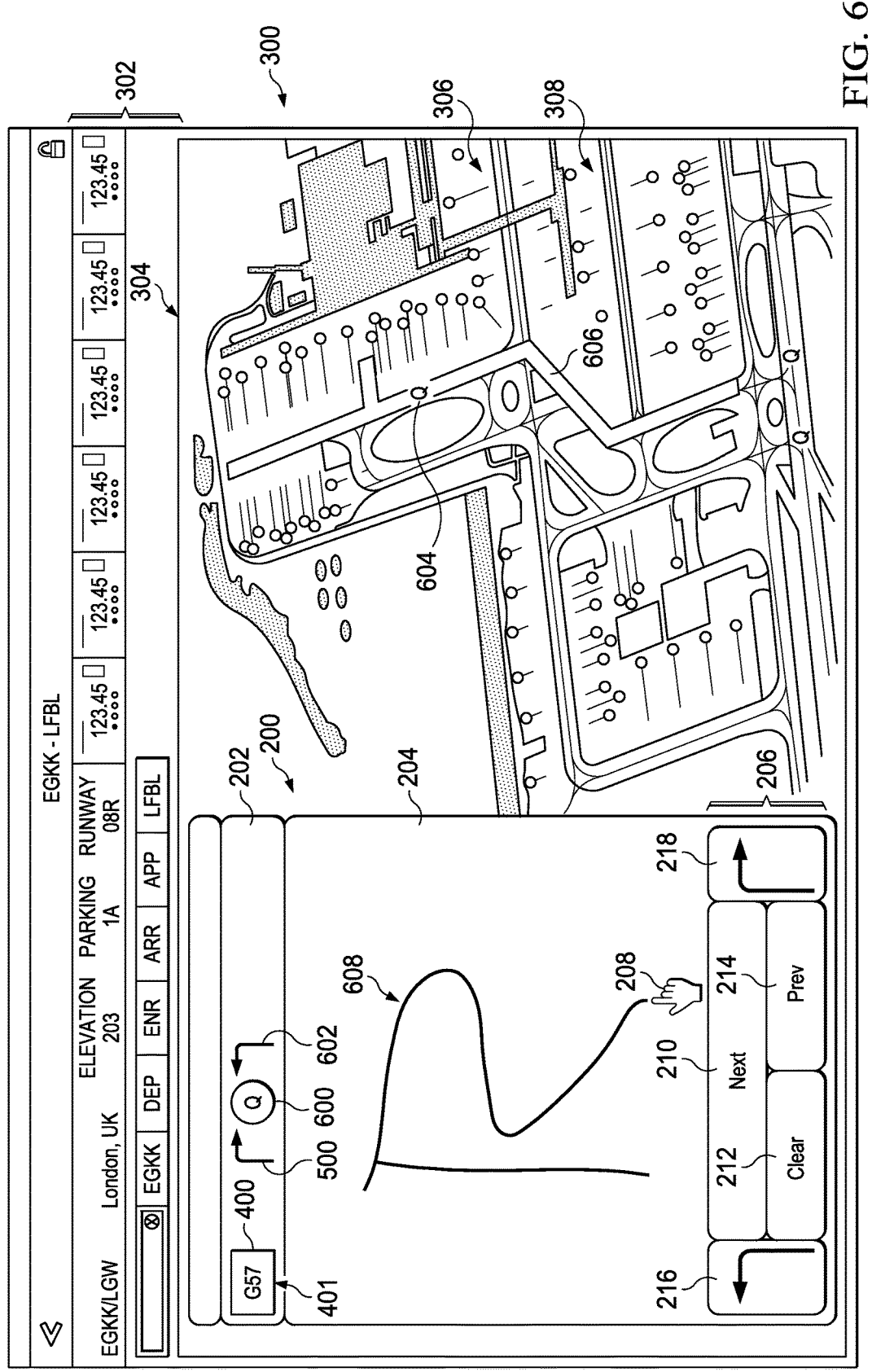
FIG. 6 is an illustration of the addition of a taxiway and a left turn to a taxiing route in accordance with an illustrative embodiment.

Turning now to FIG. 6, an illustration of the addition of a taxiway and a left turn to a taxiing route is depicted in accordance with an illustrative embodiment. In this illustrative example, graphical element 600 and graphical element 602 have been added to route display area 202. Graphical element 600 represents taxiway Q and graphical element 602 represents a left turn.

In response to the taxiway Q and the left turn being added to taxiing route 401, airport map 306 is also updated. Graphical element 604 and graphical element 606 have been added to airport map 306.

In this illustrative example, the operator may next enter character input 608 and then select right turn button 218. In response to this input, the route manager will identify the route element corresponding to character input 608 and add this route element and a right turn to taxiing route 401.

Figure 7:
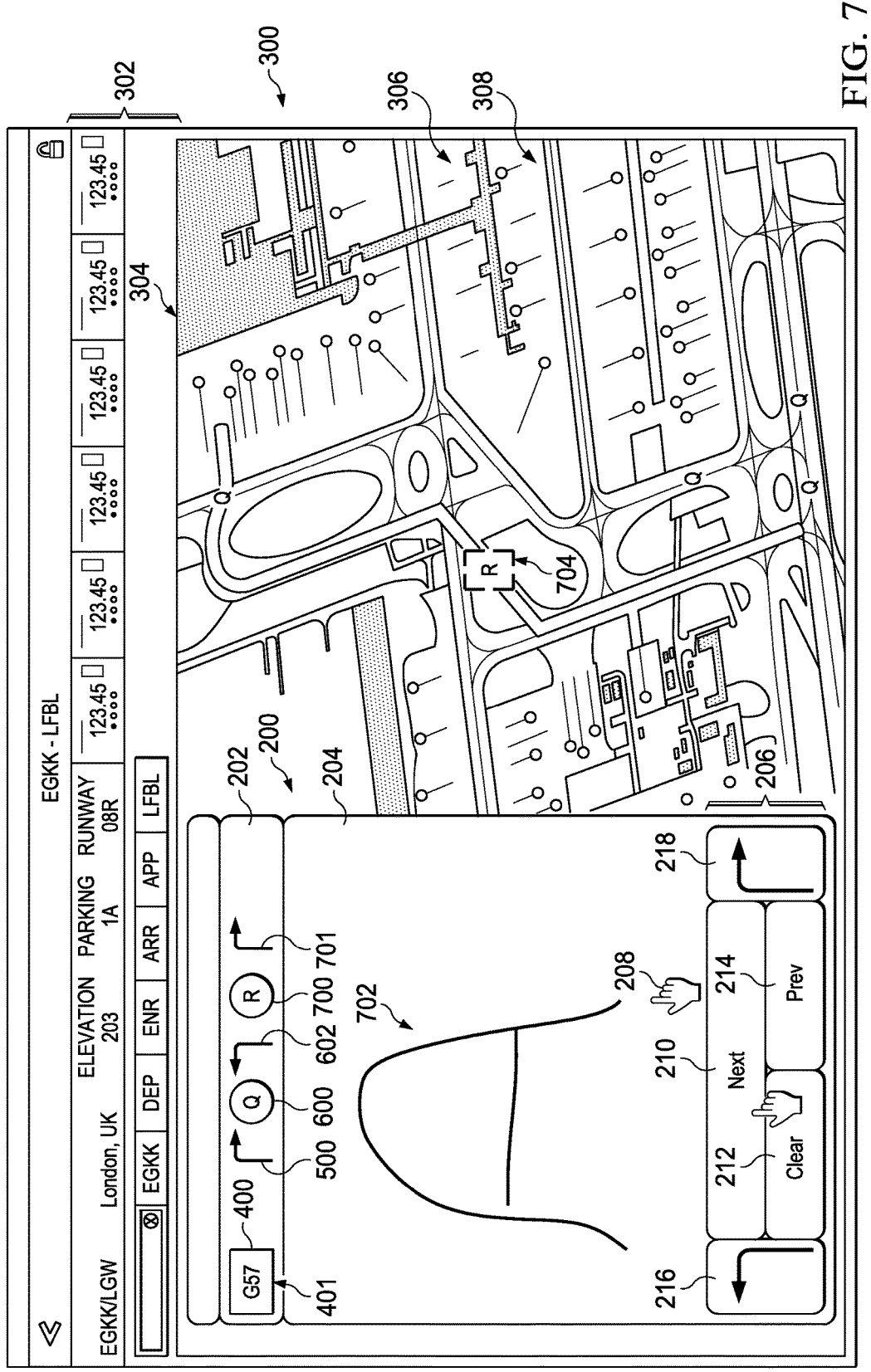
FIG. 7 is an illustration of the addition of a taxiway to a taxiing route in accordance with an illustrative embodiment.

With reference now to FIG. 7, an illustration of the addition of a taxiway to a taxiing route is depicted in accordance with an illustrative embodiment. In this illustrative example, graphical element 700 and graphical element 701 have been added to route display area 202. Graphical element 700 represents taxiway R and graphical element 701 represents the right turn.

The addition of taxiway R and the right turn to taxiing route 401 results in the updating of airport map 306. In particular, graphical element 704 representing the taxiway R is added to airport map 306. In this illustrative example, the operator next enters character input 702 and selects next button 210.

Figure 8:
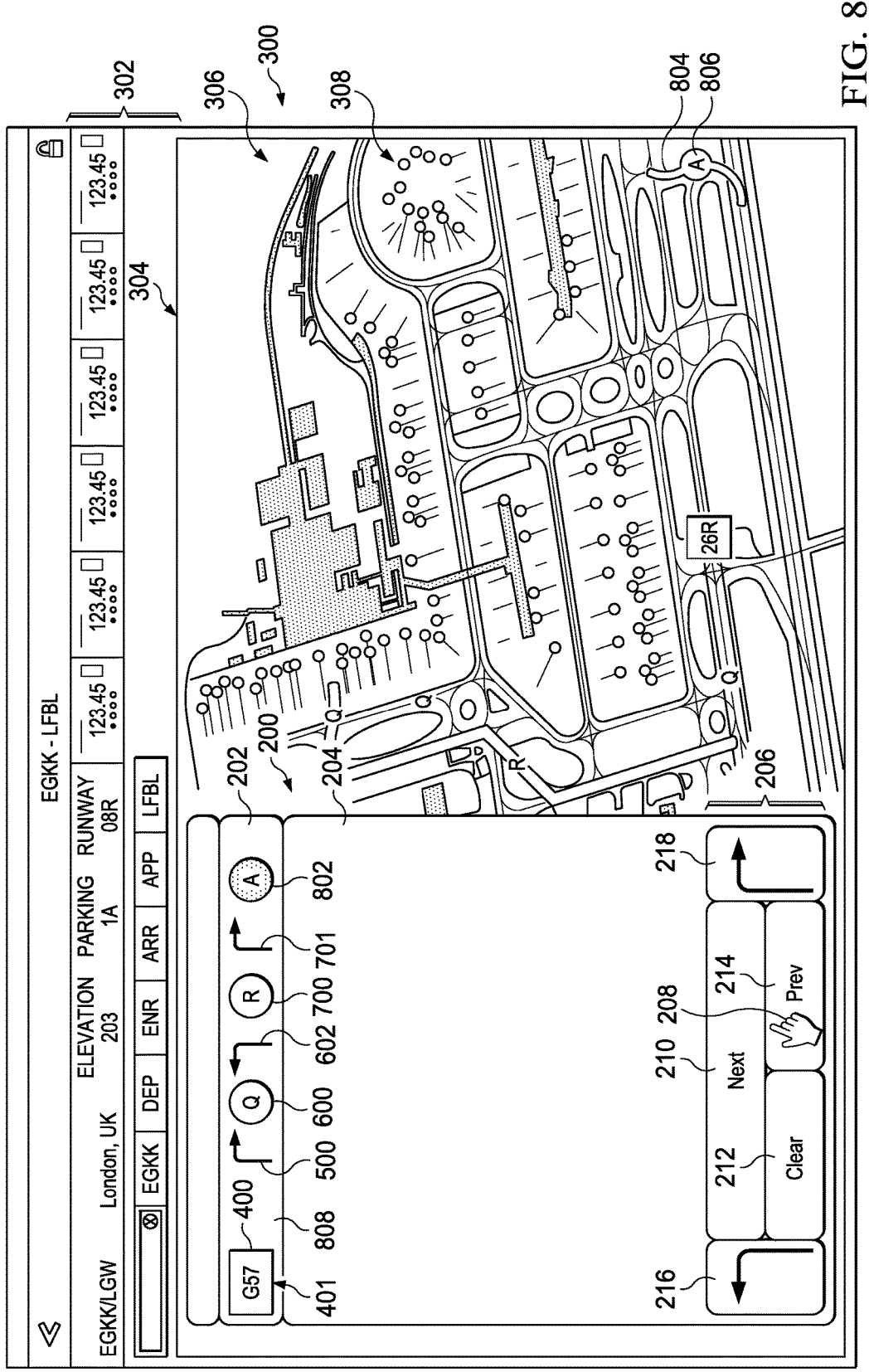
FIG. 8 is an illustration of the addition of a taxiway to a taxiing route in accordance with an illustrative embodiment.

With reference now to FIG. 8, an illustration of the addition of a taxiway to a taxiing route is depicted in accordance with an illustrative embodiment. In this illustrative example, graphical element 802 has been added to route display area 202. Graphical element 802 represents taxiway A. Further, the addition of taxiway A to taxiing route 401 results in the updating of airport map 306. In particular, graphical element 804 and graphical element 806 are added to airport map 306.

However, as depicted, color 808 of route display area 202 has changed. Color 808 indicates that the route elements newly added to taxiing route 401 may not be consistent with the previously added route elements. The operator may then select previous button 214 to remove taxiway A from taxiing route 401 and add another route element to taxiing route 401.

Figure 9:
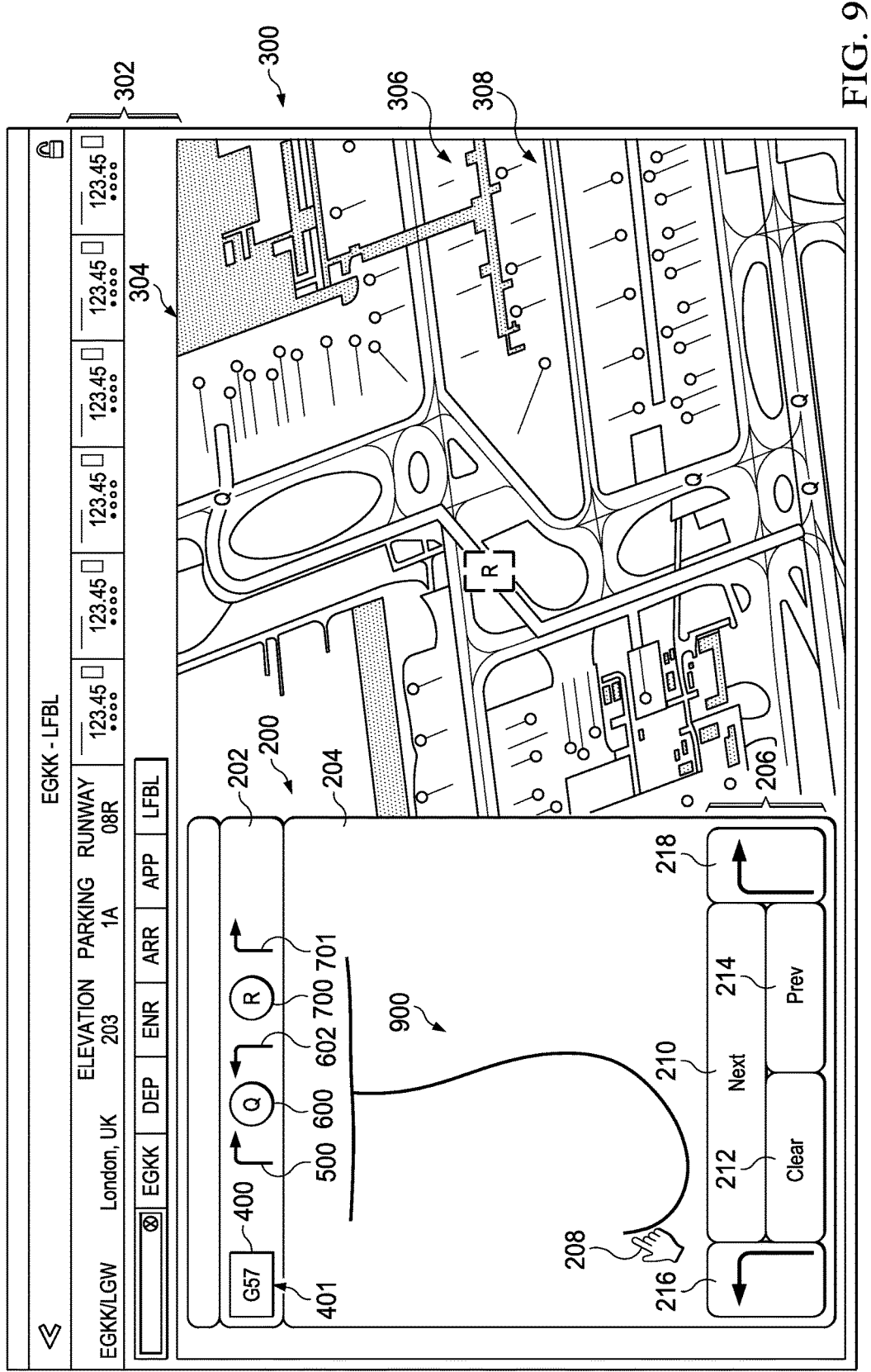
FIG. 9 is an illustration of the reentry of character input in accordance with an illustrative embodiment.

With reference now to FIG. 9, an illustration of the reentry of character input is depicted in accordance with an illustrative embodiment. In response to the selection of previous button 214 in FIG. 8, graphical element 802 from FIG. 8 has been removed from route display area 202. The operator may now enter new character input 900 and select next button 210.

Figure 10:
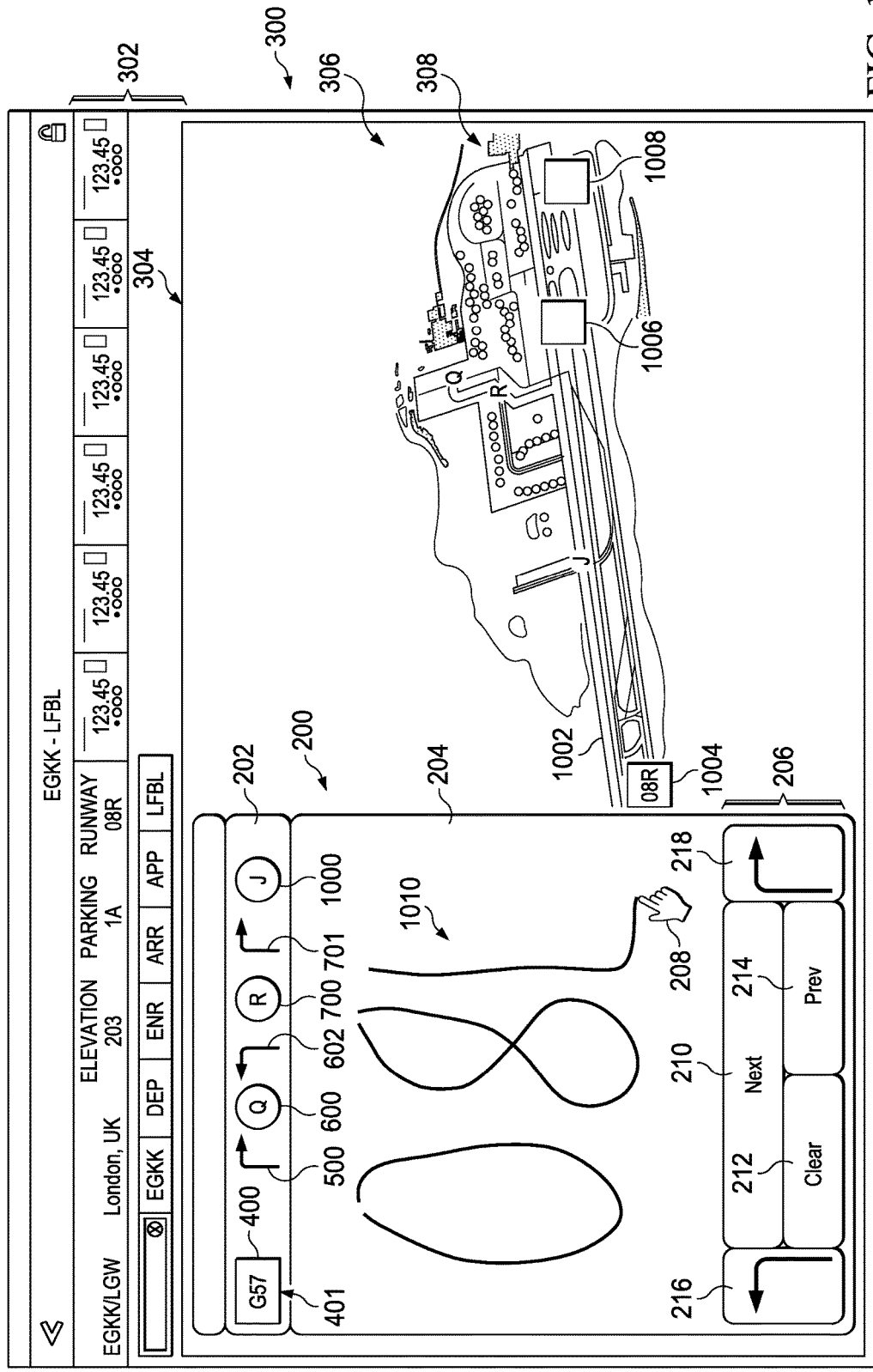
FIG. 10 is an illustration of the addition of a taxiway to a taxiing route in accordance with an illustrative embodiment.

With reference now to FIG. 10, an illustration of the addition of a taxiway to a taxiing route is depicted in accordance with an illustrative embodiment. In this illustrative example, graphical element 1000 has been added to route display area 202. Graphical element 1000 represents taxiway J.

Further, the addition of taxiway J to taxiing route 401 results in the updating of airport map 306. In this illustrative example, a zoomed out view of airport 308 is visually presented within map area 304. Graphical element 1002 has been added to airport map 306 to represent the taxiing route. Graphical elements 1004, 1006, and 1008 represent other airport features of airport 308.

In this illustrative example, the operator next enters character input 1010. The operator then selects next button 210.

Figure 11:
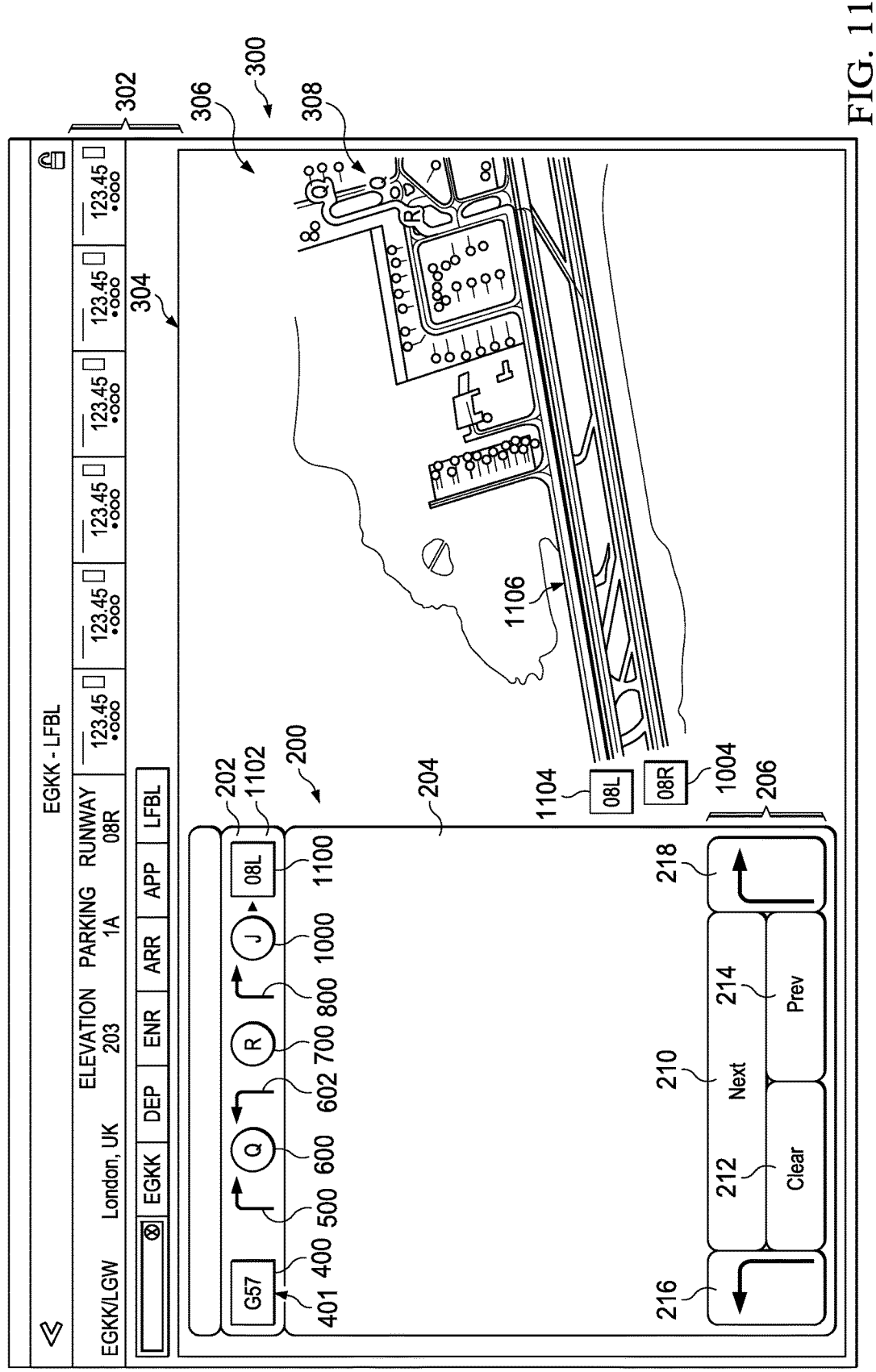
FIG. 11 is an illustration of the addition of a runway to a taxiing route in accordance with an illustrative embodiment.

With reference now to FIG. 11, an illustration of the addition of a runway to a taxiing route is depicted in accordance with an illustrative embodiment. In this illustrative example, graphical element 1100 has been added to route display area 202. Graphical element 1100 represents runway 08L.

The addition of runway 08L to taxiing route 401 indicates that taxiing route 401 is complete. Consequently, route display area 202 is updated with color 1102 and character input section 204 has been cleared. Further, graphical element 1104, representing runway 08L at airport 308, is added to airport map 306. In this illustrative example, final taxiing route 1106 is visually presented relative to airport 308 in airport map 306.

The illustrations of graphical user interface 300 in FIGS. 3-11 are not meant to imply physical or architectural limitations to the manner in which an illustrative embodiment may be implemented. Other components in addition to or in place of the ones illustrated may be used. Some components may be optional.

Figure 12:
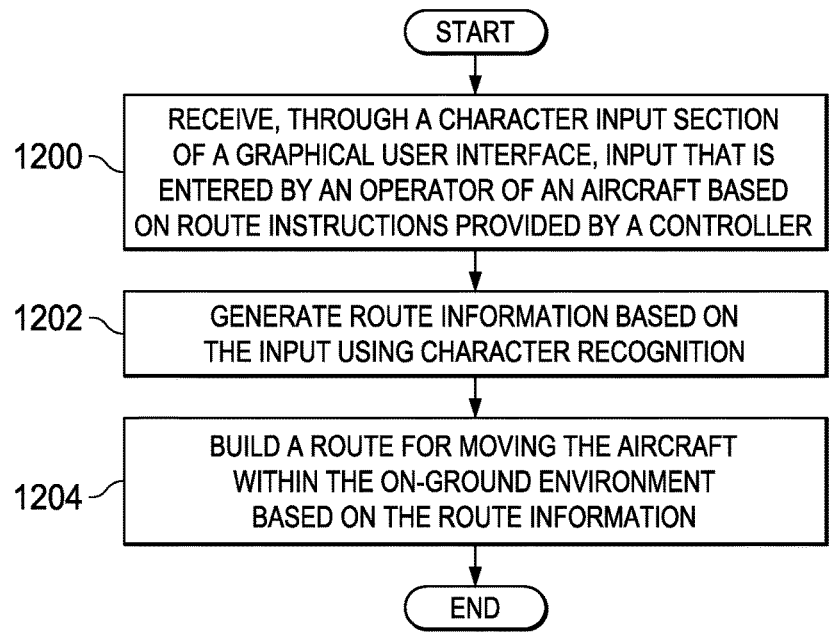
FIG. 12 is an illustration of a process for building a route for moving an aircraft within an on-ground environment in the form of a flowchart in accordance with an illustrative embodiment.

With reference now to FIG. 12, an illustration of a process for building a route for moving an aircraft within an on-ground environment is depicted in the form of a flowchart in accordance with an illustrative embodiment. The process described in FIG. 12 may be implemented using route management system 100 from FIG. 1.

The process may begin by receiving, through a character input section of a graphical user interface, input that is entered by an operator of an aircraft based on route instructions provided by a controller (operation 1200). The controller may be, for example, without limitation, a ground controller of ATC.

Next, route information may be generated based on the input using character recognition (operation 1202). Thereafter, a route for moving the aircraft within the on-ground environment may be built based on the route information (operation 1204), with the process terminating thereafter.

Figure 13:
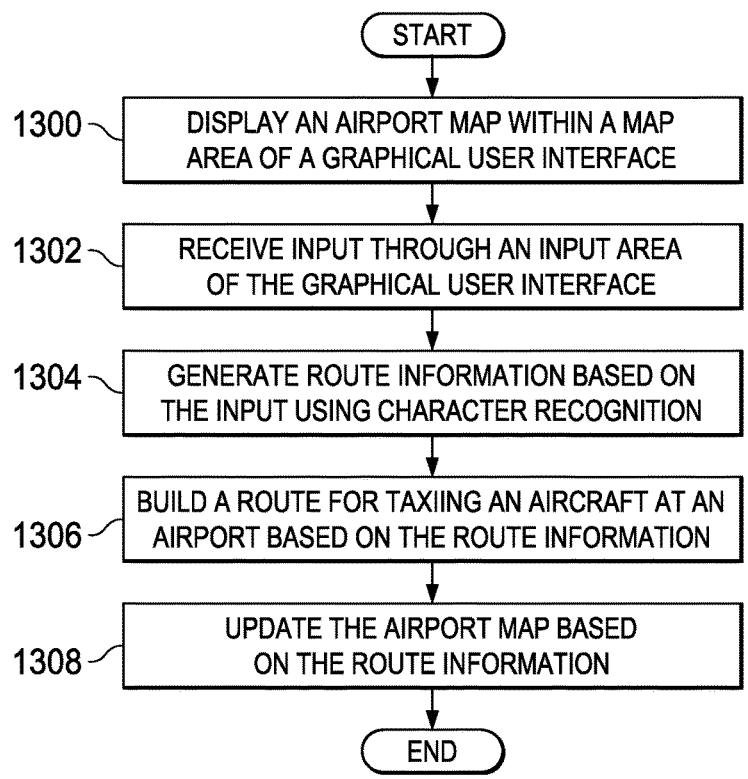
FIG. 13 is an illustration of a process for building a route for taxiing an aircraft at an airport in the form of a flowchart in accordance with an illustrative embodiment.

With reference now to FIG. 13, an illustration of a process for building a route for taxiing an aircraft at an airport is depicted in the form of a flowchart in accordance with an illustrative embodiment. The process described in FIG. 13 may be implemented using route management system 100 from FIG. 1.

The process may begin by displaying an airport map within a map area of a graphical user interface (operation 1300). Next, input may be received through an input area of the graphical user interface (operation 1302). Route information is generated based on the input using character recognition (operation 1304).

A route for taxiing an aircraft at an airport is built based on the route information (operation 1306). Further, the airport map is updated based on the route information (operation 1308), with the process terminating thereafter.

Figure 14:
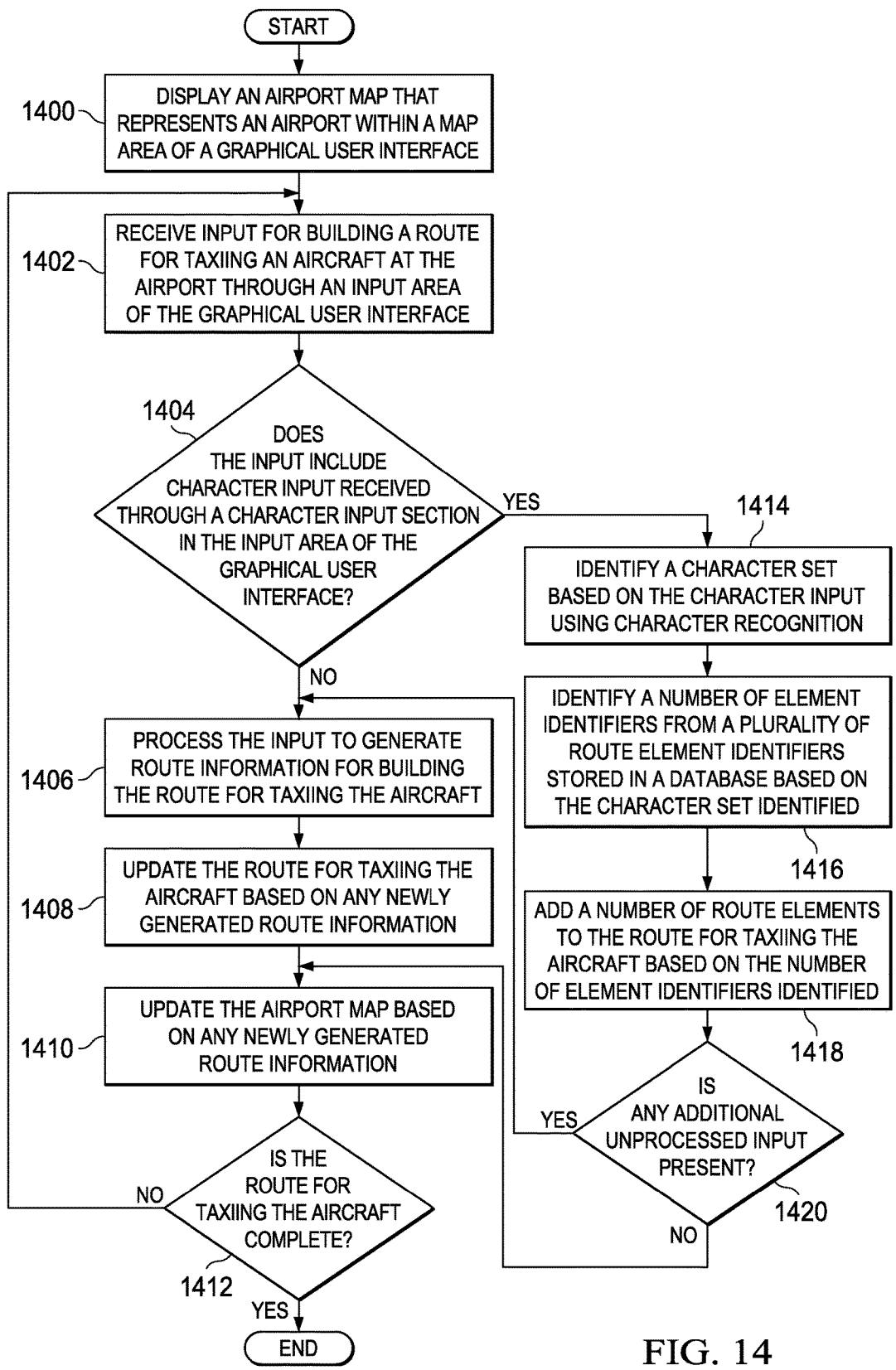
FIG. 14 is an illustration of a process for building a route for taxiing an aircraft at an airport in the form of a flowchart in accordance with an illustrative embodiment.

With reference now to FIG. 14, an illustration of a process for building a route for taxiing an aircraft at an airport is depicted in the form of a flowchart in accordance with an illustrative embodiment. The process described in FIG. 14 may be implemented using route management system 100 from FIG. 1.

The process may begin by displaying an airport map that represents an airport within a map area of a graphical user interface (operation 1400). Next, input for building a route for taxiing an aircraft at the airport may be received through an input area of the graphical user interface (operation 1402). A determination is made as to whether the input includes a character input received through a character input section in the input area of the graphical user interface (operation 1404).

If the input does not include a character input, the input is processed to generate route information for building the route for taxiing the aircraft (operation 1406). The route for taxiing the aircraft may then be updated based on any newly generated route information (operation 1408).

Further, the airport map may be updated based on any newly generated route information (operation 1410). In operation 1410, updating the airport map may include at least one of adding a number of graphical symbols to the airport map, removing a number of graphical symbols from the airport map, changing a number of graphical symbols that are already on the airport map, changing the portion of the airport represented on the airport map, zooming into the airport map, zooming out of the airport map, or some other type of display operation.

A determination may then be made as to whether the route for taxiing the aircraft is complete (operation 1412). If the route is complete, the process terminates. Otherwise, the process proceeds to operation 1402 and wait until further input is received in operation 1402.

With reference again to operation 1404, if the input includes character input, a character set is identified based on character input using character recognition (operation 1414). A number of route element identifiers may be identified from a plurality of route element identifiers stored in a database based on the character set identified (operation 1416). A number of route elements are added to the route for taxiing the aircraft based on the number of route element identifiers identified (operation 1418).

A determination may then be made as to whether any additional unprocessed input is present (operation 1420). If any additional unprocessed input is present, the process proceeds to operation 1406 as described above. Otherwise, the process proceeds to operation 1410 as described above.

Figure 15:
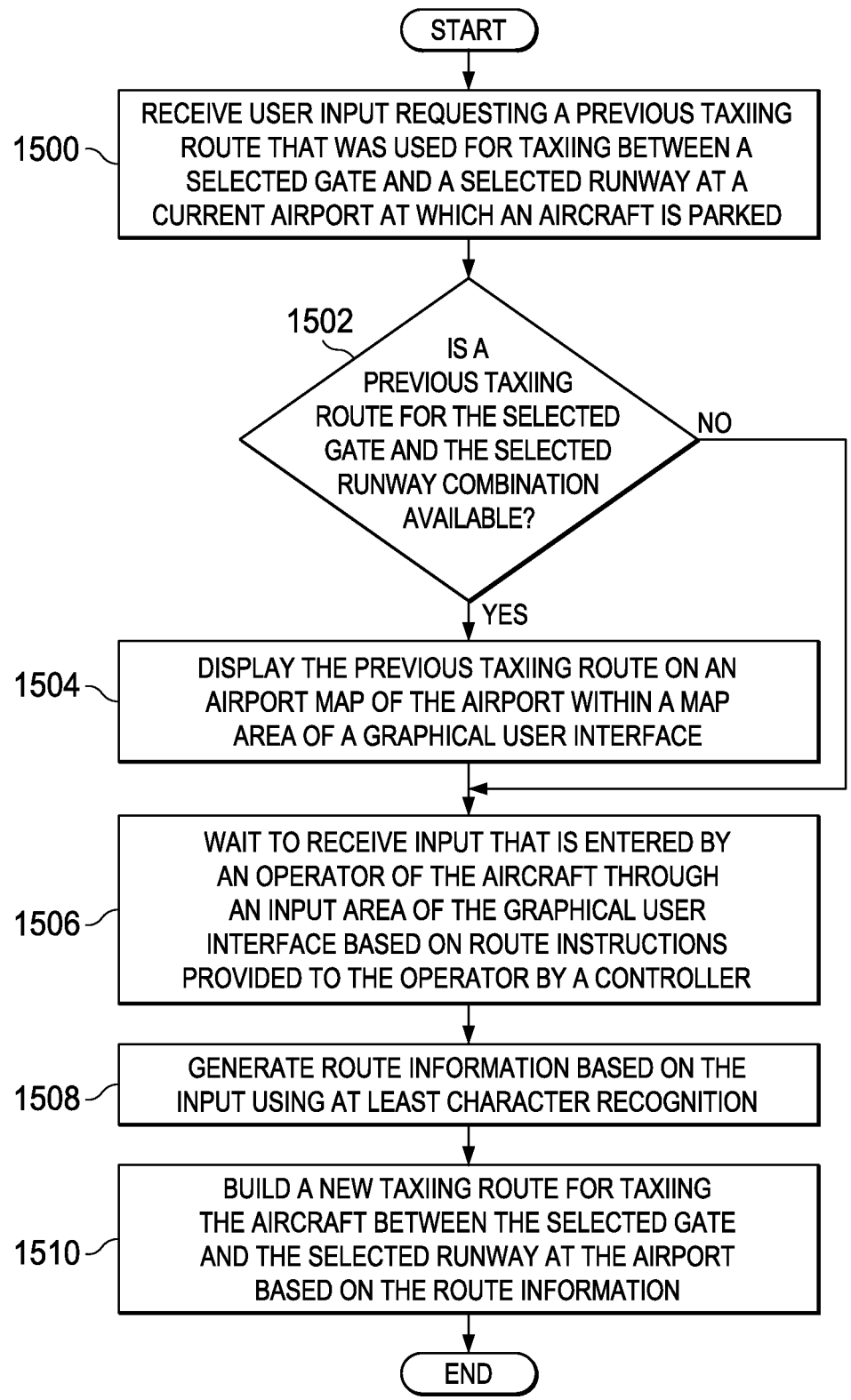
FIG. 15 is an illustration of a process for building a taxiing route in the form of a flowchart in accordance with an illustrative embodiment.

With reference now to FIG. 15, an illustration of a process for building a taxiing route is depicted in the form of a flowchart in accordance with an illustrative embodiment. The process illustrated in FIG. 15 may be implemented using route management system 100 in FIG. 1.

The process may begin receiving user input requesting a previous taxiing route that was used for taxiing between a selected gate and a selected runway at a current airport at which an aircraft is parked (operation 1500). In operation 1500, the user input may include, for example, without limitation, an identifier for the selected gate and an identifier for the selected runway.

Next, a determination may be made as to whether a previous taxiing route for the selected gate and the selected runway combination is available (operation 1502). In one illustrative example, the previous taxiing route may be for taxiing from the selected gate to the selected runway. In another illustrative example, the previous taxiing route may be for taxiing from the selected runway to the selected gate.

If a previous taxiing route is available, the previous taxiing route is displayed on an airport map of the airport within a map area of a graphical user interface (operation 1504). The display of the previous taxiing route in operation 1504 enables the operator of the aircraft to familiarize himself or herself with this previous taxiing route. This previous taxiing route may be the same or similar to the taxiing route that is to be built.

Thereafter, the process waits to receive input that is entered by an operator of the aircraft through an input area of the graphical user interface based on route instructions provided to the operator by a controller (operation 1506). With respect to operation 1506, the process may be on pause until the operator establishes communication with the controller and requests that the controller provide route instructions for taxiing the aircraft between the selected gate and the selected runway. For example, the operator may wait until the operator has had sufficient time to familiarize himself or herself with the previous taxiing route prior to requesting instructions from the controller. In operation 1506, the input may be entered through, for example, without limitation, a scratchpad similar to scratchpad 200 in FIG. 2.

Route information is generated based on the input using character recognition (operation 1508). Depending on the input received, one or more other types of input recognition techniques, processes, or methods may be used in addition to character recognition. In operation 1508, at least character recognition is used. A new taxiing route for taxiing the aircraft between the selected gate and the selected runway at the airport is built based on the route information (operation 1510), with the process terminating thereafter. In other illustrative examples, the airport map that is displayed in the map area of the graphical user interface may be dynamically updated as the new taxiing route is built in operation 1510.

With reference again to operation 1502, if a previous taxiing route is not available, the process may proceed directly to operation 1506 as described above. The process described in FIG. 15 may enable an operator of an aircraft to more easily and quickly enter input in correspondence with the route instructions provided by the controller. In particular, by allowing the operator to familiarize himself or herself with the previous taxiing route prior to receiving the route instructions from the controller, the operator may be better briefed and better prepared to receive the route instructions, which may ultimately save time. In some illustrative examples, the previous taxiing route that is retrieved may be used for auto-completing input on the scratchpad, for quality-checking purposes, some other type of purpose, or some combination thereof.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
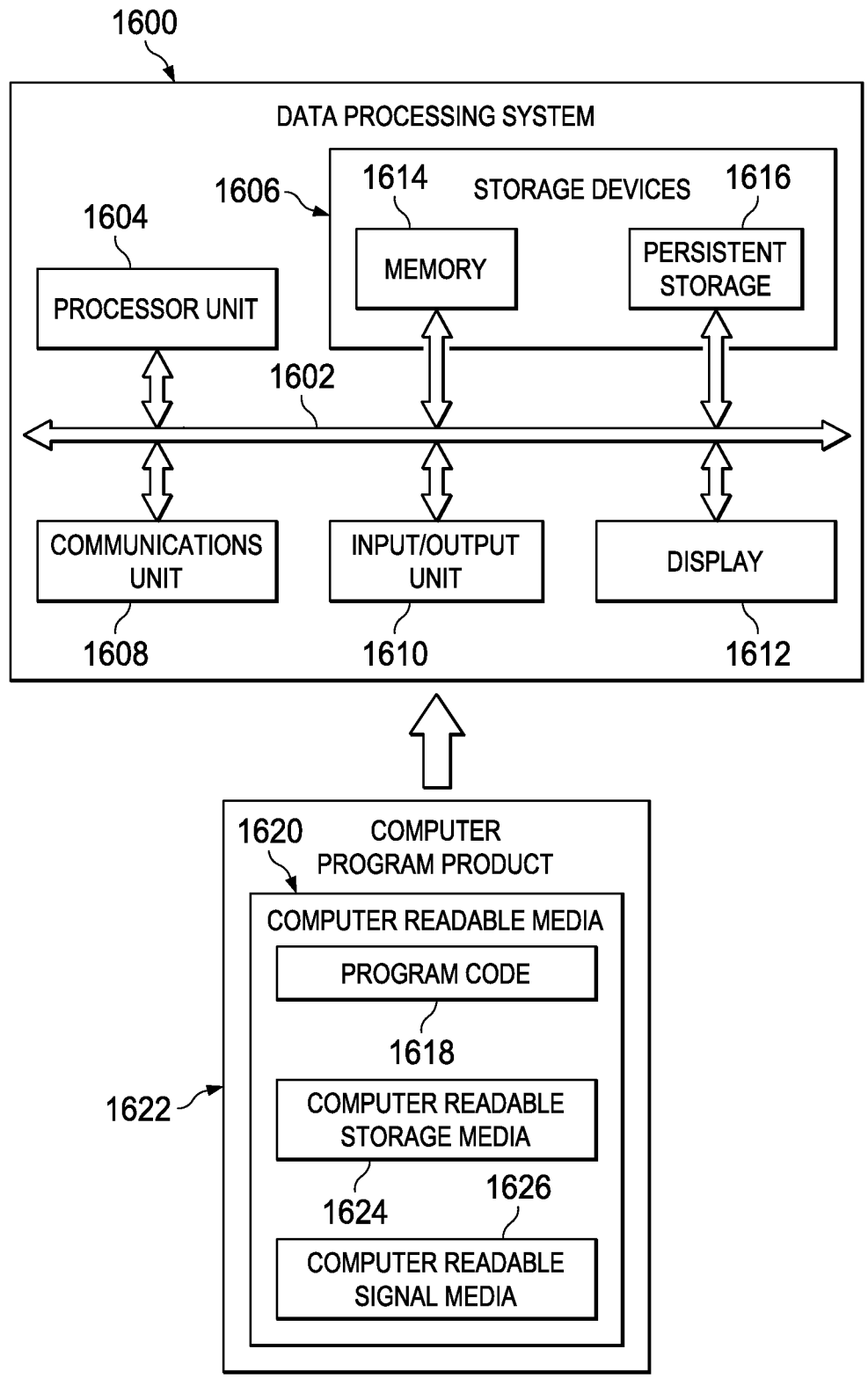
FIG. 16 is an illustration of a data processing system in the form of a block diagram in accordance with an illustrative embodiment.

Turning now to FIG. 16, an illustration of a data processing system in the form of a block diagram is depicted in accordance with an illustrative embodiment. Data processing system 1600 may be used to implement computer system 112 in FIG. 1. As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise a number of processors, a multi-processor core, and/or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications, and/or programs run by processor unit 1604 may be located in storage devices 1606. Storage devices 1606 may be in communication with processor unit 1604 through communications framework 1602. As used herein, a storage device, also referred to as a computer readable storage device, is any piece of hardware capable of storing information on a temporary and/or permanent basis. This information may include, but is not limited to, data, program code, and/or other information.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems and/or devices. Communications unit 1608 may provide communications using physical and/or wireless communications links.

Input/output unit 1610 allows input to be received from and output to be sent to other devices connected to data processing system 1600. For example, input/output unit 1610 may allow input to be received through a keyboard, a mouse, and/or some other type of input device. As another example, input/output unit 1610 may allow output to be sent to a printer connected to data processing system 1600.

Display 1612 is configured to display information to a user. Display 1612 may comprise, for example, without limitation, a monitor, a touch screen, a laser display, a holographic display, a virtual display device, and/or some other type of display device.

In this illustrative example, the processes of the different illustrative embodiments may be performed by processor unit 1604 using computer-implemented instructions. These instructions may be referred to as program code, computer usable program code, or computer readable program code and may be read and executed by one or more processors in processor unit 1604.

In these examples, program code 1618 is located in a functional form on computer readable media 1620, which is selectively removable, and may be loaded onto or transferred to data processing system 1600 for execution by processor unit 1604. Program code 1618 and computer readable media 1620 together form computer program product 1622. In this illustrative example, computer readable media 1620 may be computer readable storage media 1624 or computer readable signal media 1626.

Computer readable storage media 1624 is a physical or tangible storage device used to store program code 1618 rather than a medium that propagates or transmits program code 1618. Computer readable storage media 1624 may be, for example, without limitation, an optical or magnetic disk or a persistent storage device that is connected to data processing system 1600.

Alternatively, program code 1618 may be transferred to data processing system 1600 using computer readable signal media 1626. Computer readable signal media 1626 may be, for example, a propagated data signal containing program code 1618. This data signal may be an electromagnetic signal, an optical signal, and/or some other type of signal that can be transmitted over physical and/or wireless communications links.

The illustration of data processing system 1600 in FIG. 16 is not meant to provide architectural limitations to the manner in which the illustrative embodiments may be implemented. The different illustrative embodiments may be implemented in a data processing system that includes components in addition to or in place of those illustrated for data processing system 1600. Further, components shown in FIG. 16 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a touch-screen for displaying a graphical user interface that includes a character input section and that is configured to receive a selection input for receiving input that is entered by an operator of an aircraft based on route instructions provided by a controller, wherein the input to the character input section comprises characters that are hand-drawn on the touch screen and then electronically captured and recognized by a processor in communication with the graphical user interface, and wherein the selection input comprises selection of a left turn or a right turn by the operator of the aircraft; and
a route manager in communication with the graphical user interface, wherein the route manager:
receives the input entered through the character input section and the selection input,
generates route information comprising a route element based on the input to the character input section using character recognition,
builds a route for moving the aircraft within an on-ground environment by adding the route element to the route,
adds a left turn to the route in response to receiving the selection input comprising selection of the left turn, and
adds a right turn to the route in response to receiving the selection input comprising selection of the right turn.

2. The apparatus of claim 1, wherein the graphical user interface comprises:
a route display area for displaying at least a portion of a plurality of route elements that form the route as the route is being built.

3. The apparatus of claim 1, wherein the graphical user interface comprises:
a map area, wherein the route manager updates a map within the map area based on the route information.

4. The apparatus of claim 1, wherein the route manager generates the route information using a digital map of the on-ground environment.

5. The apparatus of claim 1, wherein the graphical user interface comprises:
an input area that includes the character input section and a set of control objects for receiving the selection input.

6. The apparatus of claim 5, wherein the set of control objects includes at least a left turn button and a right turn button.

7. The apparatus of claim 1 further comprising:
a display system, wherein the graphical user interface is displayed on the display system; and
an input system integrated with the display system that enables the operator to enter the input in the character input section of the graphical user interface using at least one of a finger of the operator, a stylus, or a digital pen.

8. The apparatus of claim 1 further comprising:
a database in communication with at least one of the route manager or the graphical user interface, wherein the database stores at least one of map data, a plurality of element identifiers, and reference data.

9. The apparatus of claim 8, wherein the plurality of element identifiers identify at least one of a parking location, a terminal, a gate, a taxiway, a runway, a holding area, or a deicing area.

10. A route management system comprising:
a processor;
a touch-screen display system in communication with the processor;
a graphical user interface displayed on the display system, wherein the graphical user interface comprises: an input area that includes a character input section and a set of control objects for receiving a selection input, wherein the input area receives hand-drawn characters in the character input section on the touch screen, wherein the processor electronically captures and recognizes the hand-drawn characters as input, and wherein the selection input comprises selection of a left turn or a right turn; and
a route manager that receives the input through the character input section and the selection of a left turn or a right turn in the set of control objects, generates route information comprising a route element based on the input to the character input section using character recognition, builds a route for taxiing an aircraft at an airport by adding the route element to the route, adds a left turn to the route in response to receiving the selection input comprising selection of the left turn, and adds a right turn to the route in response to receiving the selection input comprising selection of the right turn.

11. The route management system of claim 10, wherein the graphical user interface includes a map area for displaying an airport map and wherein the route manager updates the airport map as the route is being built.

12. A method for building a route for moving an aircraft within an on-ground environment, the method comprising:
receiving, through a character input section of a graphical user interface displayed on a touch-screen, input entered by an operator of the aircraft based on route instructions provided by a controller, wherein the input comprises characters that are hand-drawn on the touch screen and then electronically captured and recognized by a processor in communication with the touch screen;
generating route information comprising a route element based on the input to the character input section using character recognition;
building the route for moving the aircraft within the on-ground environment by adding the route element to the route;
receiving, through the graphical user interface, a selection input comprising selection of a left turn or a right turn by the operator of the aircraft;
adding a left turn to the route in response to receiving the selection input comprising selection of the left turn, and
adding a right turn to the route in response to receiving the selection input comprising selection of the right turn.

13. The method of claim 12 further comprising: performing at least one of removing the route element from the route or modifying the route element of the route.

14. The method of claim 12, wherein receiving the input comprises: receiving the input through the character input section of the graphical user interface as touch input generated by at least one of a finger of the operator, a stylus, or a digital pen.

15. The method of claim 12, wherein generating the route information comprises:
   identifying a character set based on the input to the character input section using the character recognition; and
   identifying the route element for the route, based on the character set.

16. The method of claim 12 further comprising:
   receiving the selection input through at least one control object in a set of control objects displayed in the graphical user interface.

17. The method of claim 12 further comprising:
   displaying a map in a map area of the graphical user interface; and
   updating the map based on the route information as the route is being built.

18. The method of claim 17, wherein updating the map comprises:
   displaying a number of graphical elements in the map to identify at least one of a terminal, a gate, a runway, a taxiway, or a holding area.

\* \* \* \* \*